United States Patent
Thorstenson et al.

(10) Patent No.: US 9,946,402 B2
(45) Date of Patent: Apr. 17, 2018

(54) DETECTING PRESENCE OF PROTECTIVE LINER ON DEVICE DISPLAY

(71) Applicant: Motorola Mobility LLC, Chicago, IL (US)

(72) Inventors: Daniel S Thorstenson, Chicago, IL (US); Roger W Ady, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 14/921,715

(22) Filed: Oct. 23, 2015

(65) Prior Publication Data

US 2017/0115819 A1 Apr. 27, 2017

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 3/0412* (2013.01)

(58) Field of Classification Search
CPC ...... G06F 3/044; G06F 3/0412; G06F 1/1677; G06F 2200/1634
See application file for complete search history.

(56) References Cited

U.S. PATENT DOCUMENTS

| | | | | |
|---|---|---|---|---|
| 2006/0216044 A1* | 9/2006 | Itabashi | ............... | G03G 15/502 399/12 |
| 2011/0074830 A1* | 3/2011 | Rapp | ................... | G06F 3/04883 345/677 |
| 2012/0110868 A1* | 5/2012 | Abbondanzio | ..... | B29C 63/0004 33/645 |
| 2013/0278562 A1* | 10/2013 | Graumann | .............. | G06F 3/044 345/174 |
| 2015/0273786 A1* | 10/2015 | Ozeki | ................... | G06F 1/1626 428/41.7 |
| 2015/0323963 A1* | 11/2015 | Tokutake | .............. | G06F 3/0416 345/173 |

* cited by examiner

*Primary Examiner* — Kent Chang
*Assistant Examiner* — Chayce Bibbee
(74) *Attorney, Agent, or Firm* — Amerson Law Firm, PLLC

(57) ABSTRACT

A method includes determining a presence of a protective liner on a display of a device using a capacitive sensor positioned proximate the display. An alignment guide is generated on the display responsive to determining the presence of the protective liner. A device includes a display, a capacitive sensor positioned proximate the display, and a processor to determine a presence of a protective liner on the display using the capacitive sensor and to generate an alignment guide on the display responsive to determining the presence of the protective liner.

20 Claims, 4 Drawing Sheets

DETECTING PRESENCE OF PROTECTIVE LINER ON DEVICE DISPLAY

BACKGROUND

Field of the Disclosure

The disclosed subject matter relates generally to mobile computing systems and, more particularly, to detecting the presence of a protective liner on the display of a device.

Description of the Related Art

Mobile devices include displays that also function as touch sensitive user interfaces. Many mobile devices include glass displays. While glass displays are resistant to scratching, they are susceptible to breaking if the device is dropped or sufficient pressure is applied to the display. While plastic displays are less susceptible to breaking, they are less resistant to scratching due to user handling, storage, etc.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-6 illustrate example techniques for detecting the presence of a protective liner on a display of a device. In the illustrated embodiments, the display has a plastic outer surface, making it susceptible to damage. A protective liner placed over the display has a conductive element that may be detected by the device to verify the presence of the protective liner. The liner is attached so that it can be removed and replaced without damaging the display assembly beneath, either at a repair center or by the user. Replacement would occur when the liner has been scratched or otherwise damaged and the user desires a new liner. The device may alert a user of the absence of the protective liner and any warranty implications. The device may also interact with the conductive element on the protective liner to assist the user in aligning the protective liner as it is placed on the display.

Figure 1:
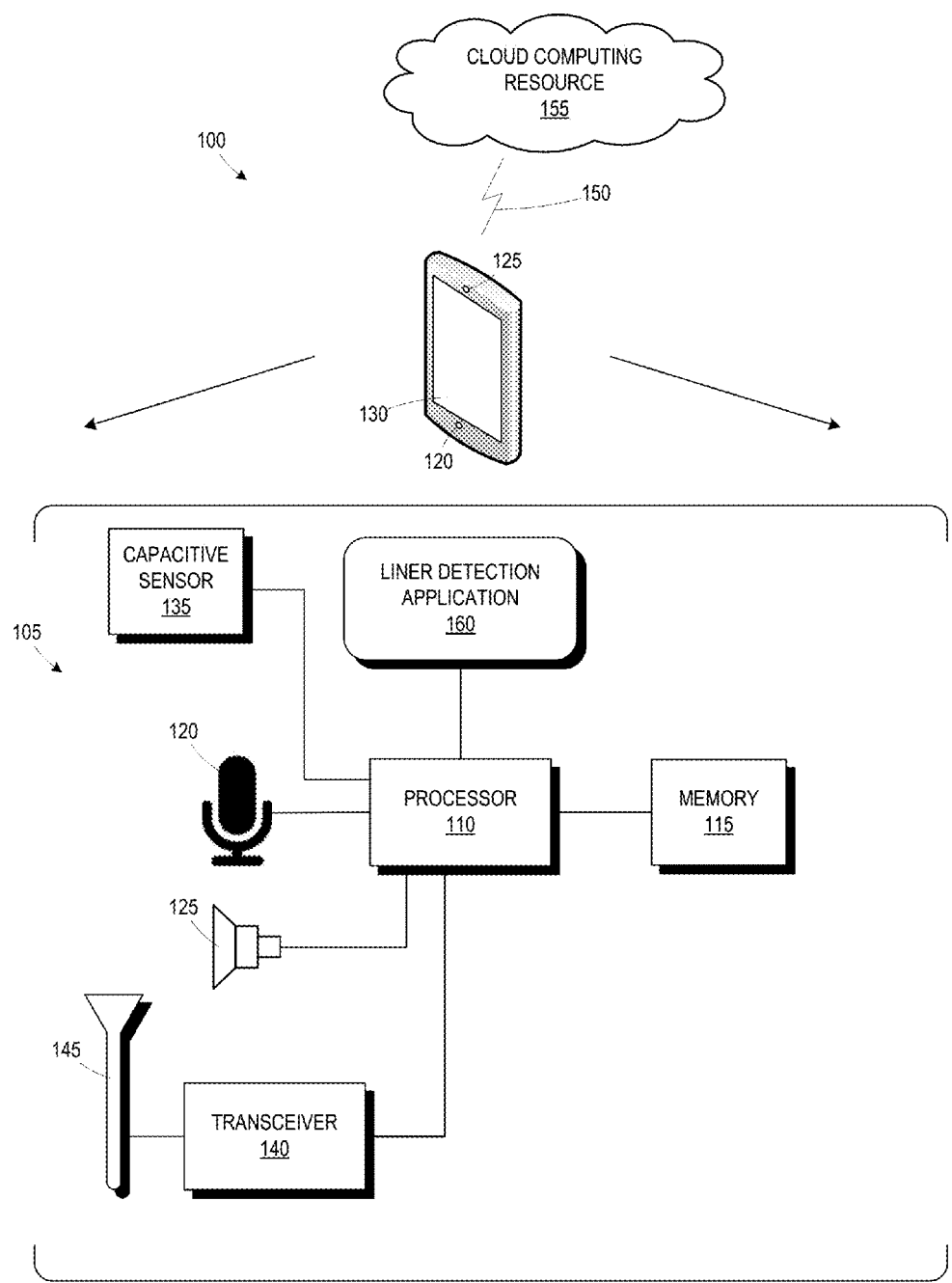
FIG. 1 is a simplified block diagram of a mobile device operable to detect the presence of a protective liner on its display, according to some embodiments disclosed herein.

FIG. 1 is a simplistic block diagram of a device 100. The device 100 implements a computing system 105 including, among other things, a processor 110, a memory 115, a microphone 120, a speaker 125, a display 130, and a capacitive sensor 135 associated with the display 130. The memory 115 may be a volatile memory (e.g., DRAM, SRAM) or a non-volatile memory (e.g., ROM, flash memory, hard disk, etc.). The device 100 includes a transceiver 140 for transmitting and receiving signals via an antenna 145 over a communication link 150. The transceiver 140 may include one or more radios for communicating according to different radio access technologies, such as cellular, Wi-Fi, Bluetooth®, etc. The communication link 150 may have a variety of forms. In some embodiments, the communication link 150 may be a wireless radio or cellular radio link. The communication link 150 may also communicate over a packet-based communication network, such as the Internet. In one embodiment, a cloud computing resource 155 may interface with the device 100 to implement one or more of the functions described herein.

In various embodiments, the device 100 may be embodied in a handheld or wearable device, such as a laptop computer, a handheld computer, a tablet computer, a mobile device, a telephones, a personal data assistants, a music player, a game device, a wearable computing device, and the like. To the extent certain example aspects of the device 100 are not described herein, such example aspects may or may not be included in various embodiments without limiting the spirit and scope of the embodiments of the present application as would be understood by one of skill in the art.

In the device 100, the processor 110 may execute instructions stored in the memory 115 and store information in the memory 115, such as the results of the executed instructions. Some embodiments of the processor 110 and the memory 115 may be configured to implement a liner detection application 160. For example, the processor 110 may execute the liner detection application 160 to determine if a protective liner is present on the display 130. One or more aspects of the techniques may also be implemented using the cloud computing resource 155 in addition to the liner detection application 160.

Figure 2:
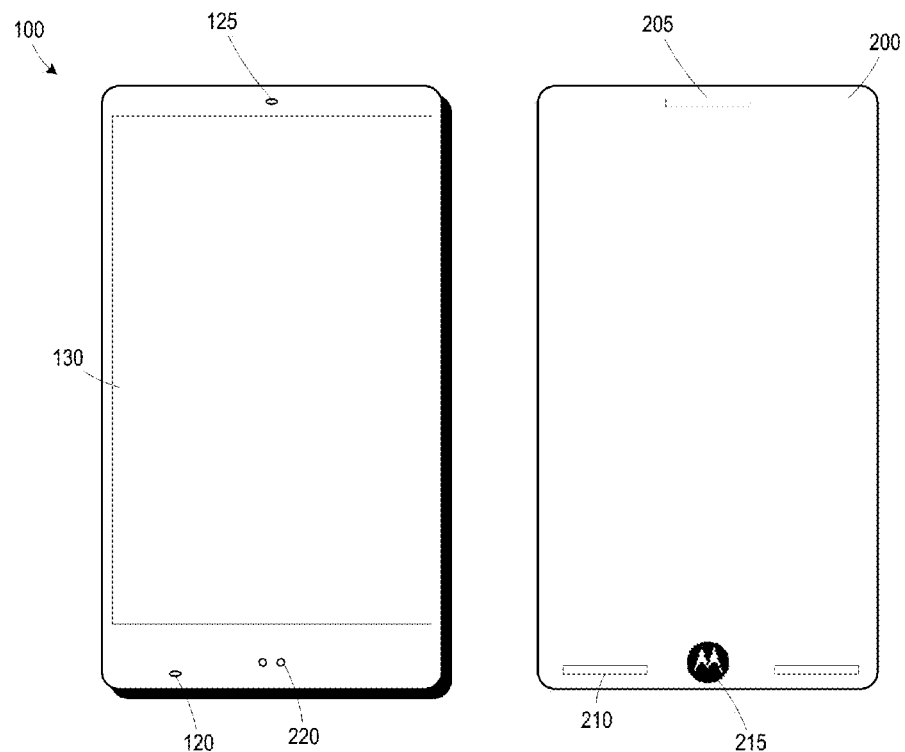
FIG. 2 is a front view of the device of FIG. 1 and a protective liner that may be placed over a display of the device, according to some embodiments disclosed herein.

FIG. 2 is a front view of the device 100 and a protective liner 200 that may be placed over the display 130. The protective liner 200 may include one or more cutouts 205, 210 to expose the underlying speaker 125 and microphone 120, respectively. The locations of the speaker 125 and the microphone 120, and any corresponding cutouts 205, 210 may vary or may not be present at all, depending on the particular implementation. A conductive member 215 is provided on the protective liner 200 to allow the detection of the protective liner 200. Electrodes 220 are provided on the device 100 proximate the display 130 for detecting the presence of the conductive member 215.

Figure 3:
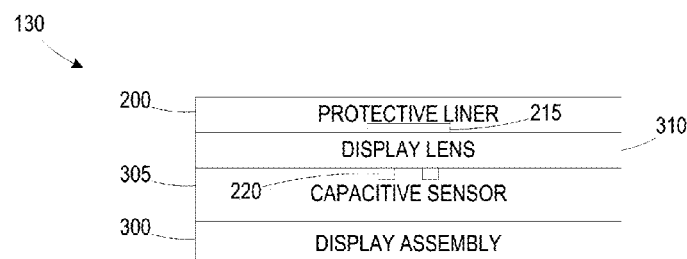
FIG. 3 is a partial cross section of the device of FIG. 1 illustrating a portion of the display, according to some embodiments disclosed herein.

FIG. 3 is a partial cross section of the device 100 illustrating a portion of the display 130. The display 130 includes a display assembly 300, a capacitive sensor layer 305, and a display lens 310. The display assembly 300 includes one or more layers, such as an active layer including the pixels. The layers may be adhesively bonded to one another or they may be fabricated as a unified stack. The display assembly 300 may be formed using a flexible material, such as used in plastic organic light emitting diode display (pOLED). The capacitive sensor layer 305 employs a sensor grid that senses when a user touches the display. The particular construction of the display assembly 300 and the capacitive sensor layer 305 is known to those of ordinary skill in the art, so it is not described in greater detail herein.

In some embodiments, the electrodes 220 may be disposed beneath the capacitive sensor layer 305.

The processor 110 may receive or determine a conductivity or resistance measurement across the electrodes 220 to detect the presence or absence of the protective liner 200 based thereon. In some embodiments, the conductive member 215 may be opaque and therefore visible. As illustrated in FIG. 2, the conductive element 215 is located outside the active region of the display 130, so the use of a visible logo or other shape would not interfere with device operation. A metallic or other opaque material may be formed on the productive liner 200 to define the conductive element 215.

In other embodiments, the conductive element 215 may be a transparent conductive material (e.g., indium tin oxide (ITO)). For example, the conductive element 215 may be located over the active region of the display 130, so if it were visible it would block a portion of the display 135

Although the electrodes 220 are illustrated as being separate devices, in some embodiments, the capacitive sensor layer 305 may sense the presence of the conductive element 215, thereby functioning as a protective liner detector. The presence of the conductive element 215 may alter the operation of the grid used for touch sensing, so a calibration of the capacitive sensor layer 305 may be performed to compensate for the presence of the conductive element 215.

Figure 4:
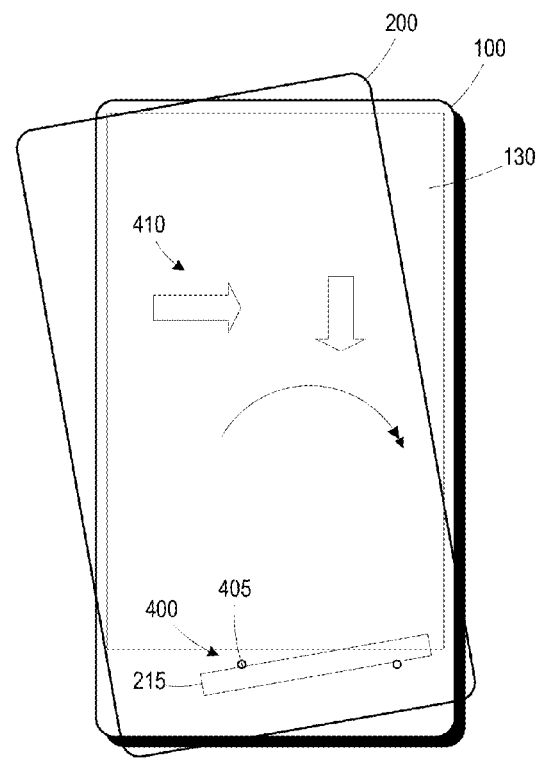
FIG. 4 is a diagram illustrating the alignment between the display and the protective liner, according to some embodiments disclosed herein.

In some embodiments, the conductive element 215 may be used in assisting the user with the alignment of the protective liner 200. FIG. 4 is a diagram illustrating the alignment between the display 130 and the protective liner 200. For illustrative purposes, the alignment angles are exaggerated. A capacitive sensor 400 including at least two electrodes 405 (distinct or integrated into the capacitive sensor layer 305 of FIG. 3) interfaces with a conductive element 405 provided on the protective liner 200. Misalignment between the conductive element 405 and the capacitive sensor 400 modulates the capacitance seen across the capacitive sensor 400. The arrangement shown in FIG. 4 may be positioned horizontally as illustrated or, in an alternative arrangement, vertically proximate an edge of the device 100. One or more sets of capacitive sensors 400 and conductive elements 215 may be used to measure alignment in different directions or with greater precision. Based on the measured alignment, the liner detection application 160 may provide feedback to the user, such as by displaying an alignment guide 410 on the display 130 to direct the user how to correct the positioning of the protective liner 200. For example, the alignment guide 410 may include arrows (vertical, horizontal, or rotational) on the display 130 to instruct the user how to position the protective liner. When the alignment is within tolerances, the alignment guide 410 may turn green or display a message.

Figure 5:
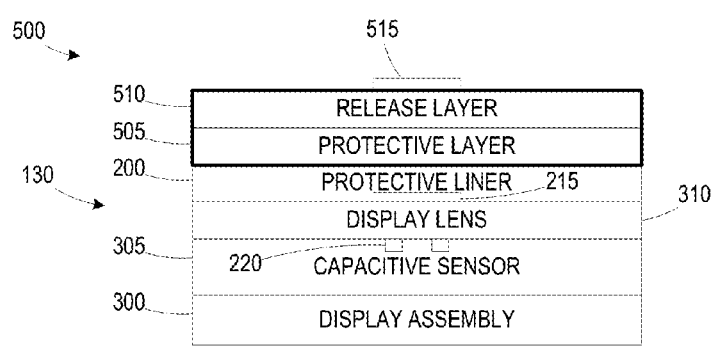
FIG. 5 is a partial cross section of the device illustrating a portion of the display and an alternative embodiment of the protective liner, according to some embodiments disclosed herein.

FIG. 5 is a partial cross section of the device 100 illustrating a portion of the display 130 and an alternative embodiment of the protective liner 500. The protective liner 500 includes a protective layer 505 contacting the display and a release layer 510 disposed above the protective layer 505. The release layer 510 is intended to be present while the user applies the protective liner 500 and then removed, leaving the protective layer 505 in place. One more conductive elements 515 are disposed on the release layer 510 (e.g., on the top surface as illustrated or on the bottom surface adjacent the protective layer 505). In some embodiments, one or more conductive elements 215 may also be disposed on the protective layer 505 (such as illustrated in FIG. 2). The conductive element 215 may be used to detect the presence of the protective liner 500 and the conductive element 515 may be used for alignment. Because the release layer 510 is temporary, the conductive element 515 may be opaque. The capacitive sensor layer 305 or separate electrodes may function as a capacitive sensor for detecting the conducive elements 215, 515.

Figure 6:
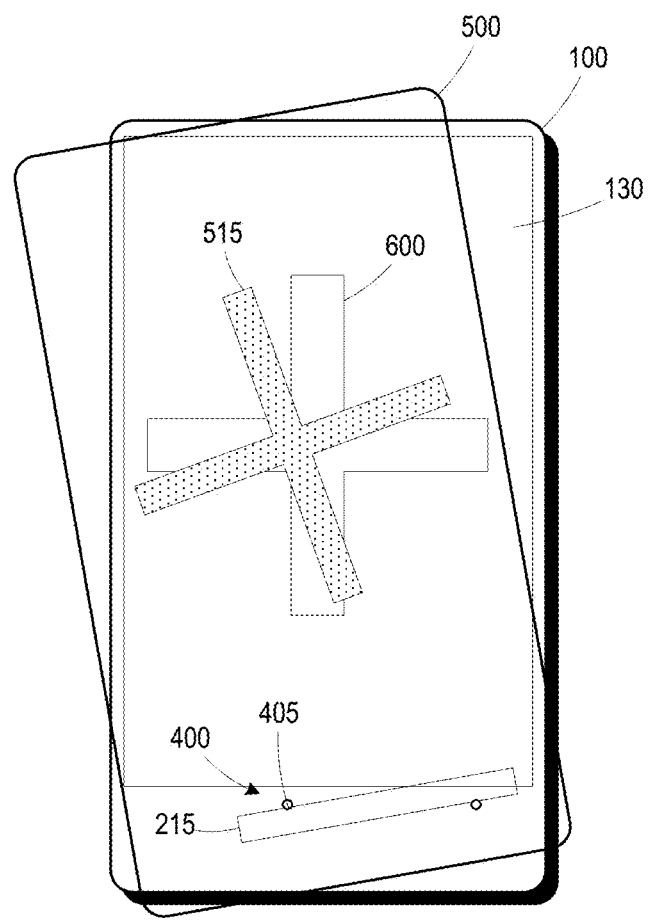
FIG. 6 is a diagram illustrating the alignment between the display and the protective liner of FIG. 5, according to some embodiments disclosed herein.

FIG. 6 is a diagram illustrating the alignment between the display 130 and the protective liner 500 of FIG. 5. Upon detecting the presence of the protective liner 500 using the conductive element 215, the liner detection application 160 generates an alignment guide 600 on the display 130. The user may align the conductive element 515 on the release layer 510 with the alignment guide 600. The liner detection application 160 may detect the proper alignment between the alignment guide 600 and the conductive element 515 using the capacitive sensor layer 305 or separate electrodes (not shown). In some embodiments, the element 515 may be only a visual guide. It may not be conductive and it may not be sensed by the device 100. The liner detection application 160 may detect the protective liner 500 using the conductive element 215 and generate the alignment guide 600 to aid the user, without providing any actual feedback regarding the alignment.

In some embodiments, the liner detection application 160 may alert the user to an absence of the protective liner 200, 500 by displaying a warning message on the display 130. The user may be informed of the missing protective liner 200, 500 and any warranty implications. For example, the liner detection application 160 may track the duration that the device 100 is without a protective liner 200, 500 and send a message to a service provider to allow appropriate warranty actions to be taken. If the user does not install a protective liner 200, 500 within a predetermined time period, the warranty may be voided by the service provider.

In some embodiments, the liner detection application 160 may be running in the background to verify the presence of the protective liner 200, 500. For example, the liner detection application 160 may detect the presence of the protective liner 200, 500 each time the device 100 exits a locked state. The alignment functionality of the liner detection application 160 may be invoked when the liner detection application 160 detects a removal of the protective liner 200, 500 and a subsequent replacement of the liner 200, 500. In some embodiments, a new protective liner 500 may have an internet address or quick response (QR) code printed on the release layer 510 that the user may enter or scan to invoke the alignment functionality of the liner detection application 160 (e.g., using the cloud computing resource 155 of FIG. 1).

Detecting the presence of the protective liner 200, 500 and providing alignment guides and/or feedback to the user improves the user experience and increases the level of protection provided for the display 130.

In some embodiments, certain aspects of the techniques described above may implemented by one or more processors of a processing system executing software. The techniques described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from a non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes determining a presence of a protective liner on a display of a device using a capacitive sensor positioned proximate the display. An alignment guide is generated on the display responsive to determining the presence of the protective liner.

A device includes a display, a capacitive sensor positioned proximate the display, and a processor to determine a presence of a protective liner on the display using the capacitive sensor and to generate an alignment guide on the display responsive to determining the presence of the protective liner.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method, comprising: determining a presence of a protective liner on a display of a device using a capacitive sensor positioned proximate the display; and generating an alignment guide on the display for aligning the protective liner responsive to determining the presence of the protective liner.

2. The method of claim 1, wherein the capacitive sensor comprises at least two electrodes, and determining the presence comprises determining the presence of a conductive element disposed on the protective liner proximate at least two electrodes.

3. The method of claim 1, wherein the capacitive sensor comprises a touch sensor of the device.

4. The method of claim 3, further comprising calibrating the touch sensor after determining the presence of the protective liner.

5. The method of claim 1, further comprising determining an alignment of the protective liner relative to the display using the capacitive sensor.

6. The method of claim 5, further comprising providing alignment feedback information on the display based on the determined alignment.

7. The method of claim 1, further comprising generating a warning message on the display responsive to detecting an absence of the protective liner.

8. The method of claim 1, wherein the protective liner comprises a conductive element.

9. The method of claim 8, wherein the protective liner comprises a protective layer contacting the display and a release layer disposed above the protective layer, wherein the conductive element is disposed on the release layer.

10. The method of claim 1, wherein the protective liner comprises a protective layer contacting the display and a release layer disposed above the protective layer, an alignment graphic is disposed on the release layer, and the alignment guide corresponds in position to the alignment graphic when the protective liner is aligned with the display.

11. A device, comprising: a display; a capacitive sensor positioned proximate the display; and a processor circuit to determine a presence of a protective liner on the display using the capacitive sensor and to generate an alignment guide on the display for aligning the protective liner responsive to determining the presence of the protective liner.

12. The device of claim 11, wherein the capacitive sensor comprises at least two electrodes.

13. The device of claim 11, wherein the capacitive sensor comprises a touch sensor of the device.

14. The device of claim 13, wherein the processor is to calibrate the touch sensor after determining the presence of the protective liner.

15. The device of claim 11, wherein the processor is to determine an alignment of the protective liner relative to the display using the capacitive sensor.

16. The device of claim 15, wherein the processor is to generate an alignment guide indicating alignment feedback information on the display based on the determined alignment.

17. The device of claim 11, wherein the processor is to generate a warning message on the display responsive to detecting an absence of the protective liner.

18. The device of claim 11, wherein the protective liner comprises a conductive element.

19. The device of claim 18, wherein the protective liner comprises a protective layer contacting the display and a release layer disposed above the protective layer, wherein the conductive element is disposed on the release layer.

20. The device of claim 11, wherein the protective liner comprises a protective layer contacting the display and a release layer disposed above the protective layer, an alignment graphic is disposed on the release layer, and the alignment guide corresponds in position to the alignment graphic when the protective liner is aligned with the display.

* * * * *